(12) United States Patent
Budde

(10) Patent No.: US 7,963,536 B2
(45) Date of Patent: Jun. 21, 2011

(54) PLASTIC PENDULUM SUPPORT

(75) Inventor: Frank Budde, Steinfeld-Mühlen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 159 days.

(21) Appl. No.: 12/306,352

(22) PCT Filed: Jun. 25, 2007

(86) PCT No.: PCT/DE2007/001115
§ 371 (c)(1),
(2), (4) Date: Dec. 23, 2008

(87) PCT Pub. No.: WO2008/000231
PCT Pub. Date: Jan. 3, 2008

(65) Prior Publication Data
US 2009/0202291 A1    Aug. 13, 2009

(30) Foreign Application Priority Data
Jun. 28, 2006   (DE) .......................... 10 2006 030 099

(51) Int. Cl.
*B62D 7/20* (2006.01)
(52) U.S. Cl. ................................... 280/93.51
(58) Field of Classification Search ............... 280/93.51, 280/93.511; 403/56, 122, 133; 74/479 R, 74/471 R
See application file for complete search history.

(56) References Cited

U.S. PATENT DOCUMENTS

| 1,829,306 | A | * | 10/1931 | Sneed ......................... 74/579 R |
| 1,898,100 | A | * | 2/1933 | Skillman ..................... 74/579 R |
| 4,887,486 | A | * | 12/1989 | Wood, Jr. ....................... 74/588 |
| 5,092,703 | A |   | 3/1992 | Kobayashi |
| 5,282,396 | A | * | 2/1994 | Crandall ......................... 74/588 |
| 5,352,059 | A |   | 10/1994 | Ueno et al. |
| 5,743,978 | A | * | 4/1998 | Otto et al. ..................... 156/73.1 |
| 6,161,451 | A | * | 12/2000 | Gleason, II ................. 74/579 R |
| 6,913,273 | B2 | * | 7/2005 | Drabon et al. ............ 280/93.502 |

FOREIGN PATENT DOCUMENTS

| DE | 25 39 698 | 3/1977 |
| EP | 0 712 742 | 5/1996 |
| EP | 0 726 177 | 8/1996 |
| GB | 1 418 823 | 12/1975 |
| JP | 2000108632 | 4/2000 |
| JP | 2000108632 A * | 4/2000 |

OTHER PUBLICATIONS

H.-J. Schuett, H. Junker und A. Seewald, Duesseldorf, Spritzgegossenes Anlenkgestaenge Fuer einen Pkw-Stabilisator, Kunststoffe, CArl Hanswer Verlag, Munchen, Germany, Bd. 82, Nr. 3, Mar. 19, 1992, pp. 217-222, XP000257527 ISSN: 0023-5563.

* cited by examiner

*Primary Examiner* — Paul N Dickson
*Assistant Examiner* — Robert A Coker
(74) *Attorney, Agent, or Firm* — McGlew and Tuttle, P.C.

(57) ABSTRACT

A plastic rocker pendulum is provided with a rod-shaped basic body (1) and mounting elements (2, 3) arranged at the free ends of the basic body (1) for the ball heads of ball pins. The cross section of the basic body (1) has an essentially S-shaped design with at least three crossbars (5, 6, 7) arranged in parallel at spaced locations from one another and connection webs (8, 9) coupling two adjacent crossbars (5, 6, 7) each. The connection webs (8, 9) are arranged at opposite end areas of the crossbars (5, 6, 7). The geometrical moment of inertia can be substantially increased compared to conventional cross sections due to this cross section shape.

16 Claims, 1 Drawing Sheet

PLASTIC PENDULUM SUPPORT

CROSS REFERENCE TO RELATED APPLICATIONS

This application is a United States National Phase application of International Application PCT/DE2007/001115 and claims the benefit of priority under 35 U.S.C. §119 of German Patent Application DE 10 2006 030 099.8 filed Jun. 28, 2006, the entire contents of which are incorporated herein by reference.

FIELD OF THE INVENTION

The present invention pertains to a plastic rocker pendulum with a rod-shaped basic body and mounting elements arranged at the free ends of the basic body for the ball heads of ball pins.

BACKGROUND OF THE INVENTION

Such plastic rocker pendulums are used, among other things, in the manufacture of motor vehicles, and manufacturing of the rocker pendulums from plastic has, in general, proved to be successful. The material used offers significant advantages especially in respect to the connection between the mounting elements and the ball heads, because the ball heads can be snapped directly into the mounting elements designed as matching ball sockets because of the elastic properties of the plastic. The process of mounting the components to be connected to one another is significantly simplified hereby and the mounting costs are comparatively low.

The use of the plastic material does, however, have the drawback that the elasticity, which is necessary, on the one hand, for the above-described mounting process, calls, on the other hand, for a substantially lower modulus of elasticity compared to other materials, especially metal, so that the absorption of forces and here especially of buckling loads is considerably reduced compared to metallic materials. The low load limit can be compensated, within certain limits, on the one hand, by increasing the cross-sectional dimensions, and, moreover, there is a possibility of bringing about an increase in the geometrical moment of inertia and hence of the load-bearing capacity of the overall construction by a special design of the cross section.

Special cross-sectional designs for the rocker pendulums of this class described are known, for example, from DE 25 39 698 A1. A construction called torsion bar linkage, which comprises a connection rod made of plastic with ball sockets formed integrally from the same plastic in one piece at its two ends, and wherein ball pins are snapped in a sealed manner into the ball sockets, is described in this document. The torsion bar linkage consists as a whole of polyurethane, and the connection rod has an H-shaped cross section with a relatively thin web and thin flanges.

Moreover, it can be determined from U.S. Pat. No. 5,352, 059 that the basic body of this class may have a plurality of webs arranged next to each other, which are connected to one another by means of a connection web arranged approximately centrally. Such an arrangement has a geometrical moment of inertia that is increased by approx. 30% compared to that of the embodiment known from the aforementioned document, an equal space (outer circle of the cross sections as a reference variable) being used for the calculation in each case.

The cross sections known so far are definitely sufficient for numerous applications and the loads arising there, but the solutions known from the state of the art reach their limits in case of special requirements with increased load values and restricted space dimensions.

SUMMARY OF THE INVENTION

An object of the present invention is therefore to design a plastic rocker pendulum of this class such that, contrary to prior-art solutions, it has an even more greatly increased geometrical moment of inertia, so that the rocker pendulums of the new design can also be used in areas where metallic materials have hitherto been used as the material for the rocker pendulum. In addition, the design of the rocker pendulum shall make possible a simple manufacturing process, because the tube cross sections predestined for an optimal geometrical moment of inertia can be manufactured in case of plastic materials only by complicated processes, such as extrusion blow molding, core melting, gas injection or water injection technique.

This object is accomplished according to the present invention by the cross section of the basic body of the plastic rocker pendulum having an essentially S-shaped cross section with at least three crossbars, which are arranged in parallel to and at spaced locations from one another, and connection webs coupling two adjacent crossbars each, the connection webs being arranged at opposite end areas of the crossbars.

The described combination of features makes it possible to increase the geometrical moment of inertia even more compared to the embodiment known from the above-mentioned US document U.S. Pat. No. 5,352,059 by more than one third, the calculation being based on the same outer circle diameter. In addition, the S-shaped cross section of the plastic rocker pendulum can be shaped with simple tools, so that the subject of the present invention has low manufacturing costs and requires only a small volume for the loads to be absorbed.

It proved to be, in particular, advantageous to impart a rounded shape to the edges of the outer crossbars of the S-shaped cross section, which said edges are directed outwardly. The edge roundings reduce the necessary volume, but have no essential adverse effect on the calculated geometrical moment of inertia.

In addition, it may be useful for the thickness of the crossbars and the distance between two adjacent crossbars to have essentially equal values. This feature leads to a corresponding optimization of the load values to be absorbed. It is to be pointed out additionally in this connection that a uniform wall thickness of the cross section entails a uniform shrinkage of the component manufactured according to the injection molding process, so that stresses are avoided in the component.

Furthermore, provisions are made in a meaningful variant of the subject of the present invention for the connection webs to be arranged in the axial longitudinal direction of the rod-shaped basic body at lateral surfaces located opposite each other in at least two partial areas. Special stresses of the overall component may possibly be better absorbed due to this combination of features.

If a sufficient space is available, it may, moreover, be advantageous to arrange reinforcing ribs extending in the direction of the longitudinal axis of the basic body at least in the middle area of the basic body at the outer liming surfaces of the outer crossbars, which additionally increases the load limit of the overall construction.

Among other things, the material PA 6.6 GF 30 proved to be an especially advantageous material for embodying the plastic rocker pendulum, because this offers an optimal compromise between the necessary elasticity values for clipping the ball heads into the ball sockets of the mounting elements and at the same time provides a sufficient modulus of elasticity for the load values to be absorbed. It is, of course, also possible to use plastics without glass fiber reinforcement.

An exemplary embodiment of the subject of the present invention will be explained in more detail below on the basis of the drawings attached. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
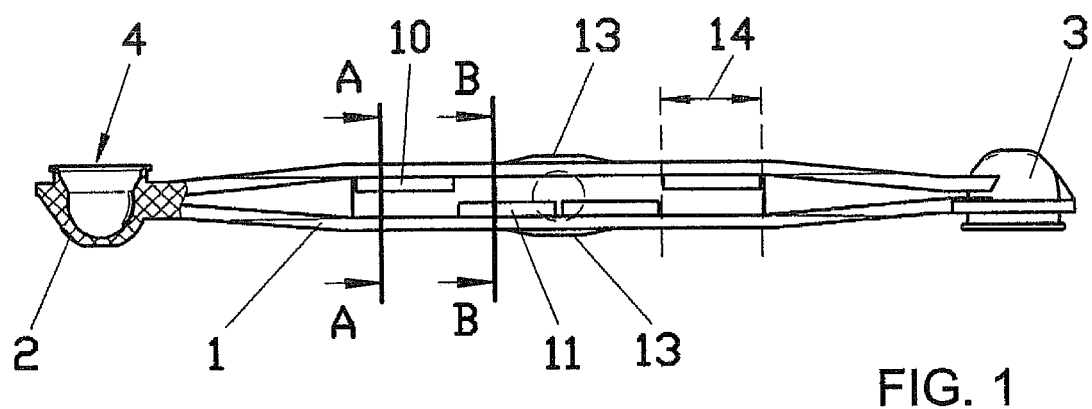
FIG. 1 is a side view of the plastic rocker pendulum according to the present invention.

Referring to the drawings in particular, the plastic rocker pendulum shown in its entirety comprises a basic body 1 as well as two mounting elements 2 and 3, which are fixed at the free ends of the basic body 1. The mounting elements are provided for introducing the ball heads of ball pins, which are not shown here. Recesses 4 in the form of ball sockets are formed within the mounting elements 2 and 3 for receiving the ball heads. The rocker pendulum is manufactured from PA 6.6 GF 30.

Figure 2:
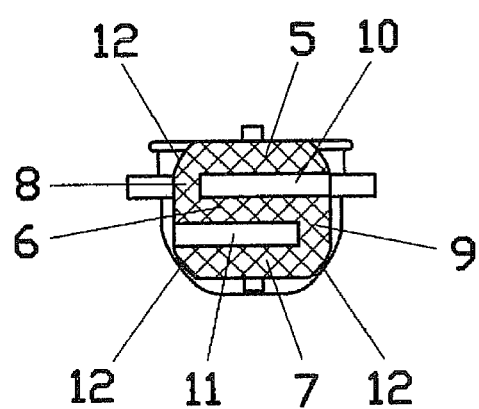
FIG. 2 is a view of cross section A-A from FIG. 1.
Figure 3:
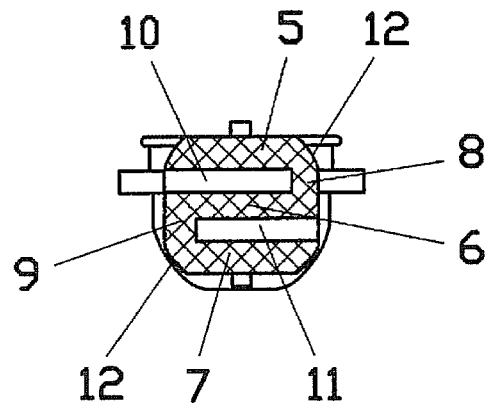
FIG. 3 is a view of cross section B-B from FIG. 1.

It becomes clear from FIGS. 2 and 3 that the basic body 1 of the plastic rocker pendulum has an essentially S-shaped cross section. The S-shaped cross section is composed of three crossbars 5, 6, 7, which are arranged in parallel at spaced locations from one another, each adjacent crossbar being coupled with one another by a respective connection web 8 and 9. The connection webs 8 and 9 are located at opposite end areas of the crossbars. The design of the cross sections in FIGS. 2 and 3 is essentially the same, the difference being only that the cross section is rotated by 180° in FIG. 3, so that the intermediate space 10 originally present in FIG. 2 and the intermediate space 11 are arranged in FIG. 3 on the side that is the opposite side in relation to FIG. 2. This provides partial areas 14, each with the arrangement of the connection webs (8, 9) at opposite lateral surfaces.

The distribution of the cross section shapes according to FIG. 2 and FIG. 3 are shown as an example in FIG. 1, where a cross section shape according to FIG. 2 was selected in the outer end areas, whereas a cross section shape according to FIG. 3 was selected in the inner area of the basic body.

Moreover, it becomes clear from FIGS. 2 and 3 that the edges of the outer crossbars 5 and 7 of the cross section, which is S-shaped as a whole, which said edges are directed towards to the outside, have roundings 12.

Moreover, it can be determined from the figures that reinforcing ribs 13 are arranged at the outer surfaces of the outer webs 5 and 7 in the center of the basic body 1.

Besides the low manufacturing costs, especially the fact that the geometrical moment of inertia is increased substantially even further compared to the state of the art, can be considered to be favorable due to the design of the cross section of the plastic rocker pendulum described, which design is novel as a whole. The present invention is not limited to the selected size embodied, and it should be borne in mind that the thickness of the crossbars and the distance between two adjacent crossbars have equal values in the exemplary embodiment shown.

This additional embodiment feature may, of course, be varied in other embodiment variants.

While specific embodiments of the invention have been shown and described in detail to illustrate the application of the principles of the invention, it will be understood that the invention may be embodied otherwise without departing from such principles.

The invention claimed is:

1. A plastic rocker pendulum comprising:
a rod-shaped basic body composed of plastic; and
mounting elements arranged at the free ends of the basic body, each of said mounting elements for receiving a ball head of a ball pin, a cross section of the basic body having an essentially S-shaped design with at least three crossbars arranged in parallel at spaced locations from one another and connection webs, each of said connection webs coupling two adjacent crossbars, wherein the connection webs are arranged at opposite end areas of the crossbars, said at least three crossbars comprising a first crossbar, a second crossbar and a third crossbar, said second crossbar being located at a position above said first crossbar, said third crossbar being located at a position above said first crossbar and said second crossbar, wherein said second crossbar is located between said first crossbar and said third crossbar, each of said mounting elements being formed of plastic, said first crossbar being connected to said second crossbar via one of said connection webs, said third crossbar being connected to said second crossbar via another one of said connection webs, said one of said connection webs being substantially perpendicular to said first crossbar and said second crossbar, said another one of said connection webs being substantially perpendicular to said second crossbar and said third crossbar.

2. A plastic rocker pendulum in accordance with claim 1, wherein the edges of the outer crossbars of the S-shaped cross section, which said edges are directed towards the outside, have roundings.

3. A plastic rocker pendulum in accordance with claim 1, wherein the thickness of the crossbars and the distance between two adjacent crossbars have essentially equal values.

4. A plastic rocker pendulum in accordance with claim 1, wherein the arrangement of the connection webs in the axial longitudinal direction of the rod-shaped basic body is arranged in at least two partial areas at opposite lateral surfaces.

5. A plastic rocker pendulum in accordance with claim 4, wherein two partial areas each are located in different connection web arrangements at the lateral surfaces of the basic body.

6. A plastic rocker pendulum in accordance with claim 1, further comprising: reinforcing ribs extending in the direction of the longitudinal axis of the basic body and arranged at the outer limiting surfaces of the outer crossbars at least in the middle area of the basic body.

7. A plastic rocker pendulum in accordance with claim 1, wherein the basic body and the mounting elements are manufactured from PA 6.6.

8. A plastic rocker pendulum in accordance with claim 1, wherein said one of said connection webs extends along a first length of said basic body on an outer end area of said basic body on a first side of said basic body, said another one of said connection webs extending along a first length of said basic body on said outer end area on a second side of said basic body, said one of said connection webs extending along a second length of said basic body on an inner area of said basic body on said second side of said basic body, said another one of said connection webs extending along a second length of said basic body on said inner area on said first side of said basic body.

9. A plastic rocker pendulum comprising:

a plastic rod-shaped basic body; and mounting elements arranged at the free ends of said plastic basic body, each of said mounting elements for the receiving a ball head of a ball pin, said plastic basic body comprising a first cross bar, a second cross bar and a third cross bar, a first connection web and a second connection web, said first cross bar and said second cross bar being parallel and spaced apart by a first intermediate space with said first cross bar connected to said second cross bar by said first connection web, each of said first cross bar, said second cross bar, said third cross bar, said first connection web and said second connection web being formed of plastic, said second cross bar and said third cross bar being parallel and spaced apart by a second intermediate space with said second cross bar connected to said third cross bar by said second connection web to provide three crossbars arranged in parallel to one another with connection webs arranged at opposite end areas of the crossbars to provide a S-shaped cross section, said second crossbar being located at a position above said first crossbar, said third crossbar being located at a position above said first crossbar and said second crossbar, wherein said second crossbar is located between said first crossbar and said third crossbar, each of said mounting elements being formed of plastic, said first connection web being substantially perpendicular to said first crossbar and said second crossbar, said second connection web being substantially perpendicular to said second crossbar and said third crossbar.

10. A plastic rocker pendulum in accordance with claim 9, wherein edges of the outer crossbars are rounded.

11. A plastic rocker pendulum in accordance with claim 9, wherein the thickness of the crossbars and the distance between two adjacent crossbars is essentially equal.

12. A plastic rocker pendulum in accordance with claim 9, wherein said first connection web, connecting said first cross bar to said second cross bar, is on one lateral side in a first partial area of said basic body and on an opposite lateral side in a second partial area of said basic body and said second connection web, connecting said second cross bar to said third cross bar, is on the one lateral side in said first partial area of said basic body and on the opposite lateral side in said second partial area of said basic body.

13. A plastic rocker pendulum in accordance with claim 12, wherein two partial areas are provided, each with different connection web arrangements at the lateral surfaces of the basic body.

14. A plastic rocker pendulum in accordance with claim 9, further comprising: reinforcing ribs extending in the direction of the longitudinal axis of the basic body and arranged at the outer limiting surfaces of the outer crossbars at least in the middle area of the basic body.

15. A plastic rocker pendulum in accordance with claim 9, wherein the basic body and the mounting elements are formed of PA 6.6.

16. A plastic rocker pendulum in accordance with claim 9, wherein said first connection web extends along a first length of said basic body on an outer end area of said basic body on a first side of said basic body, said second connection web extending along a first length of said basic body on said outer end area on a second side of said basic body, said first connection web extending along a second length of said basic body on an inner area of said basic body on said second side of said basic body, said second connection web extending along a second length of said basic body on said inner area on said first side of said basic body.

* * * * *